US009360711B2

(12) United States Patent
Ma et al.

(10) Patent No.: US 9,360,711 B2
(45) Date of Patent: Jun. 7, 2016

(54) LIQUID CRYSTAL DISPLAY

(75) Inventors: Xinli Ma, Beijing (CN); Heecheol Kim, Beijing (CN); Jai-il Ryu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 895 days.

(21) Appl. No.: 12/718,377

(22) Filed: Mar. 5, 2010

(65) Prior Publication Data

US 2010/0225632 A1 Sep. 9, 2010

(30) Foreign Application Priority Data

Mar. 6, 2009 (CN) .......................... 2009 1 0079710

(51) Int. Cl.
*G02F 1/1345* (2006.01)
*G02F 1/1339* (2006.01)

(52) U.S. Cl.
CPC .................................... *G02F 1/1339* (2013.01)

(58) Field of Classification Search
CPC ..................................................... G02F 1/1339
USPC .......................................................... 349/190
See application file for complete search history.

(56) References Cited

U.S. PATENT DOCUMENTS 5,684,555 A * 11/1997 Shiba .................... G02F 1/1345 349/149
6,803,976 B1 * 10/2004 Fujioka et al. .................. 349/54
6,839,122 B2 1/2005 Chung et al.
2004/0239858 A1 * 12/2004 Hagiwara ..................... 349/139
2005/0134549 A1 * 6/2005 Kamiya et al. ................ 345/103
2005/0213017 A1 9/2005 Yamaguchi et al.
2007/0279565 A1 * 12/2007 Iwato et al. ................... 349/139
2008/0002120 A1 * 1/2008 Tadaki et al. ................. 349/126
2008/0002134 A1 * 1/2008 Jeong .................... G02F 1/1345 349/153
2008/0018848 A1 * 1/2008 Iwato et al. ................... 349/149
2008/0055529 A1 * 3/2008 Shirasaka et al. ............. 349/143
2009/0244421 A1 * 10/2009 Ishii et al. ....................... 349/40

FOREIGN PATENT DOCUMENTS

JP 06-244405 * 9/1994 .............. H01L 29/06
JP 08-201830 * 8/1996 ............ G02F 1/1343
JP 10-153781 * 6/1998 ............ G02F 1/1337
JP 10-153781 A 6/1998
JP 2000-221521 * 8/2000 ............ G02F 1/1341
JP 2000-221521 A 8/2000
JP 2002-196355 * 7/2002 ............ G02F 1/1345
JP 2002-196355 A 7/2002
JP 2008-009407 * 1/2008 .............. G02F 1/167
KR 10-2007-0079612 * 8/2007 ............ G02F 1/1343

* cited by examiner

*Primary Examiner* — Edward Glick
*Assistant Examiner* — Anthony G Quash
(74) *Attorney, Agent, or Firm* — Ladas & Parry LLP

(57) ABSTRACT

The embodiments of the present invention disclose a liquid crystal display. The liquid crystal display comprises: a color filter substrate and an array substrate assembled together with a sealant, wherein an electrode is formed between an edge portion of an effective display region of the array substrate and the sealant, and the metal electrode is connected to a first DC power.

20 Claims, 3 Drawing Sheets

A
11'
122
14
B
12
121

LIQUID CRYSTAL DISPLAY

BACKGROUND

The present invention relates to a liquid crystal display (LCD).

Liquid crystal displays (LCDs) have a lot of advantages. For example, compared with a cathode ray tube, liquid crystal displays are thinner and have lower energy consumption. Therefore, liquid crystal displays have substituted CRT displays in many fields.

As shown in FIG. 1, a display panel of an existing thin film transistor-liquid crystal display (TFT-LCD) includes an array substrate 12, a color filter substrate 11, and a liquid crystal layer 13 interposed between the array substrate 12 and the color filter substrate 11. The peripheries of the array substrate 12 and the color filter substrate 11 are sealed with a sealant 14. FIG. 1 does not show all configurations of the liquid crystal display for the sake of brevity.

In an existing process of manufacturing a liquid crystal display, after the processes of forming the array substrate and the color filter substrate, it requires to perform a cell assembling process, i.e., a process for assembling the array substrate and the color filter substrate together. The cell assembling process includes steps of: applying an alignment film on the array substrate and the color filter substrate, respectively; curing the alignment film and rubbing the alignment film; then, drop-filling liquid crystal, applying the sealant; assembling the array substrate and the color filter substrate together and curing the sealant; and last, sectioning the assembled array substrate and color substrate so as to form separate liquid crystal cells.

During the above described cell assembling process, if the sealant comes into contact with the liquid crystal before completely cured, the liquid crystal will be polluted. The display quality of the polluted liquid crystal display panel may deteriorate dramatically. Image sticking, especially, line image sticking is liable to occur, especially around the effective display area of the liquid crystal display panel, due to the impurity ions in the sealant, the temperature, and other factors.

Various measures have been adopted to cure the sealant before it comes into contact with the liquid crystal so as to avoid the pollution to the liquid crystal due to the contact between the sealant and the liquid crystal. After the substrates are assembled, there is a short interval from the time when the liquid crystal starts to disperse to the time when the liquid crystal comes into contact with the sealant. In general, the sealant is pre-cured with UV in the short interval to prevent pollution to the liquid crystal by the impurity ions in the sealant when the sealant is in contact with the liquid crystal. However, although the sealant is pre-cured with UV, some impurity ions in the sealant may still enter into the effective display region in the liquid crystal display panel, which deteriorates the display quality of the finished liquid crystal display panel.

SUMMARY

An embodiment of the present invention provides a liquid crystal display, comprising: a color filter substrate and an array substrate assembled together with a sealant, wherein an electrode is formed between an edge portion of an effective display region of the array substrate and the sealant, and the electrode is connected to a first DC power.

In the liquid crystal display according to the present invention, the electrode is formed between the edge portion of the effective display region of the array substrate and the sealant, and the electrode is connected to the first DC power, so that an electric field and thus a voltage difference are formed between the electrode and the common electrode after the electric power is supplied to the liquid crystal display. Thus, the impurity ions in the sealant that enter into the electric field regions can be attracted by the electrode, which prevents the pollution of the liquid crystal caused by the impurity ions.

BRIEF DESCRIPTION OF THE DRAWINGS

It is apparent that the accompanying drawings described hereinafter only are some embodiments of the present invention, those skilled in the art can obtain other drawings based on these without any labor of creativity.

FIG. 2-1 is a schematic view of a liquid crystal display according to an embodiment of the present invention;

FIG. 5-1 is a schematic view of a the arrangement of the electrode and scanning lines according to an embodiment of the present invention.

DETAILED DESCRIPTION OF THE PREFERRED EMBODIMENTS

Hereinafter, a liquid crystal display according to embodiments of the present invention will be described in detail with reference to the accompanying drawings.

It is clear that the described embodiments are only a part of embodiments of the present invention, not all embodiments of the present invention. Based on the embodiments of the present invention, those skilled in the art can obtain all other embodiments within the scope of the present invention without any labor of creativity.

Figure 2:
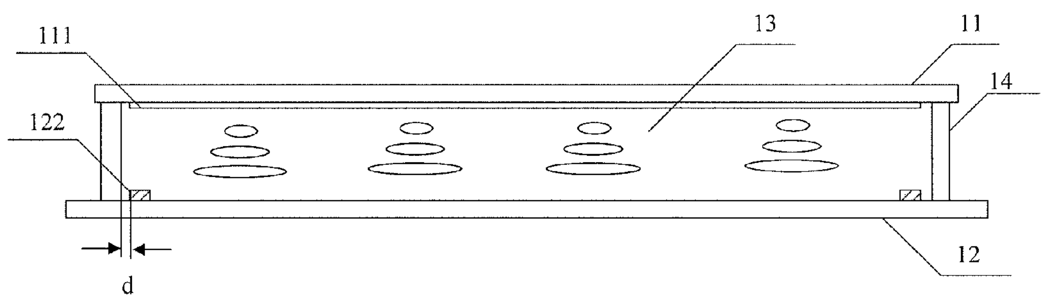
FIG. 2 is a schematic view of a liquid crystal display according to an embodiment of the present invention.

As shown in FIG. 2, a liquid crystal display of the present invention comprises a color filter substrate 11 and an array substrate 12, which are assembled together with a sealant 14, and a metal electrode 122 formed between an edge portion of an effective display region of the array substrate 12 and the sealant 14. The metal electrode 122 is connected to a first DC power (not shown in drawings). A common electrode 111 is disposed on the color filter substrate 11 above the metal electrode 122.

Figure 3:
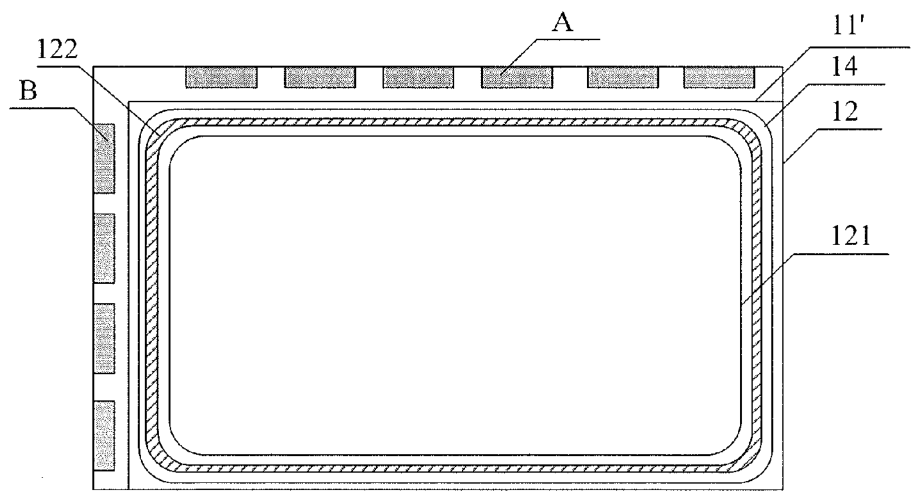
FIG. 3 is a schematic view of an array substrate in the liquid crystal display shown in FIG. 2.
Figures 1, 2:
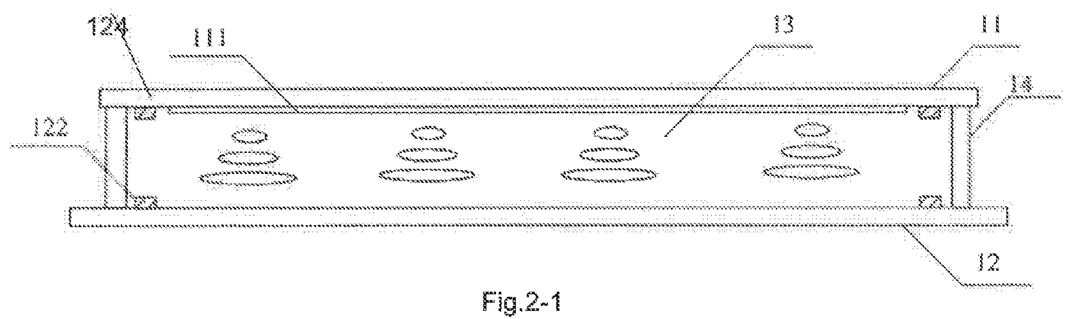

To explicitly show the position of the metal electrode 122, FIG. 3 shows the basic structure of the array substrate 12 in the liquid crystal display shown in FIG. 2. The shape 11' in FIG. 3 shows the projection of the color filter substrate 11 on the array substrate 12. The reference symbol A, B denote the input leads of a data scanning line and a gate scanning line, respectively. The metal electrode 122 is located between the display region 121 and the sealant 14 on the array substrate 12.

The metal electrode 122 is connected to the first DC power, such as, a DC drive power AVDD or the gate scanning signal Von/Voff in the liquid crystal display. When the electric power is applied on the liquid crystal display, if the metal electrode 122 is connected to the gate scanning signal Von/Voff, the voltage of metal electrode 122 is at high level Von while the gate scanning signal is at high level Von, and the voltage of metal electrode 122 is at low level Voff while the gate scanning signal is at low level Voff. In general, Von is larger than 20V, Voff is a negative voltage, and the voltage of the common electrode 111 on the color filter substrate 11 may be 5V, thus the voltage difference between the metal electrode 122 and the common electrode 111 may be approximately 5V~35V.

The voltage difference between the metal electrode 122 and the common electrode 111 located opposite to the metal electrode 122 produces an electric field. Thus, the impurity ions in the sealant 14 that enter into the area in which the electric field is formed may attach to the metal electrode 122 or the common electrode 111 on the color filter substrate 11 due to the electric field, which prevents the impurity ions in the sealant 14 from entering into the display region 121 of the liquid crystal display and thus polluting the liquid crystal molecules. The above design reduces the line image sticking of the liquid crystal display due to the impurity, and thus improves the display quality of the liquid crystal display.

To realize the embodiment in a better way, the area of the common electrode 111 on the color filter substrate 11 is preferable larger than that in a conventional liquid crystal display. That is, as shown in FIG. 3, the edge portion of the common electrode 111 is aligned with the edge portion of the metal electrode 122 neighboring the sealant 14, so that a strong electric field is formed in the area where the common electrode 111 is disposed opposite to the metal electrode 122, which is more favorable to attract the impurity ions with the metal electrode 122 and the common electrode 111.

Figure 4:
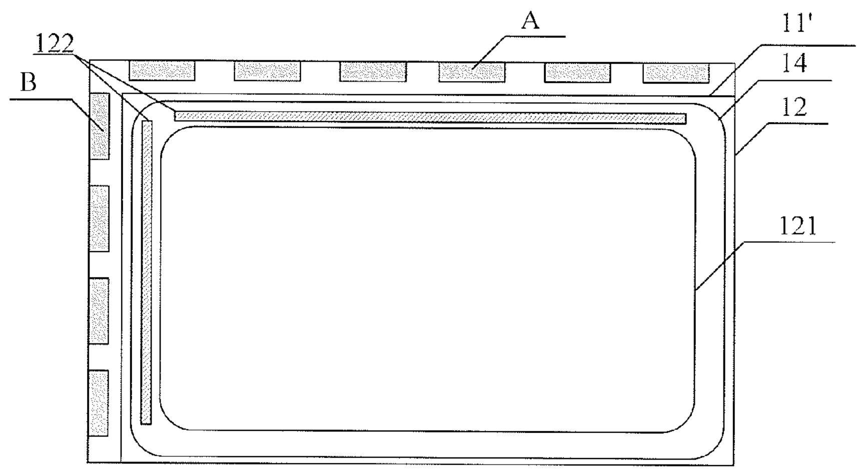
FIG. 4 is a schematic view of an another arrangement of an electrode according to an embodiment of the present invention.
Figure 5:
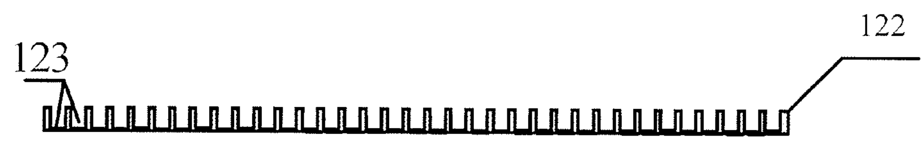

In the embodiment of the present invention, the metal electrode 122 may be disposed along (e.g., parallel with) any one side or any sides of the effective display region 121. As shown in FIG. 4, the metal electrode 122 may be disposed on one side of the display region 121 neighboring the input lead A of the data scanning line, and can also be disposed on one side of the display region 121 neighboring the input lead B of the gate scanning line. Further, the metal electrode 122 can also be disposed on the other side of the display region 121 or on both sides of the display region 121 with respect to the input lead A of the data scanning line and the input lead B of the gate scanning line. These metal electrodes 122 may be connected to each other or set apart from each other. These metal electrodes 122 also may be disposed surrounding the edge portion of the display region 121, as shown in FIG. 3.

The metal electrodes 122 can be replaced with electrodes that made of non-metal conductive material. Thus, in the above embodiments, the electrode may be made of one material or a combination of two or more selected from a group consisting of ITO, molybdenum, aluminum, and copper. The pixel electrode of the array substrate or the common electrode of the color filter substrate may be made of a metal material of ITO, and the source electrode, drain electrode, or gate electrode in the array circuit of the array substrate may be made of the metal material, such as molybdenum, aluminum, and copper. Therefore, it is convenient to obtain the material for the metal electrode 122 according to the present invention.

A distance "d" between the metal electrode 122 and the sealant 14 may be 0.3 mm~4 mm, as shown in FIG. 2. In particular, the distance between the metal electrode 122 and the sealant 14 depends on the size of the liquid crystal display panel and the size of the area between the display region 121 in the array substrate 12 and the sealant 14, and should be determined according to actual needs.

Figure 1:
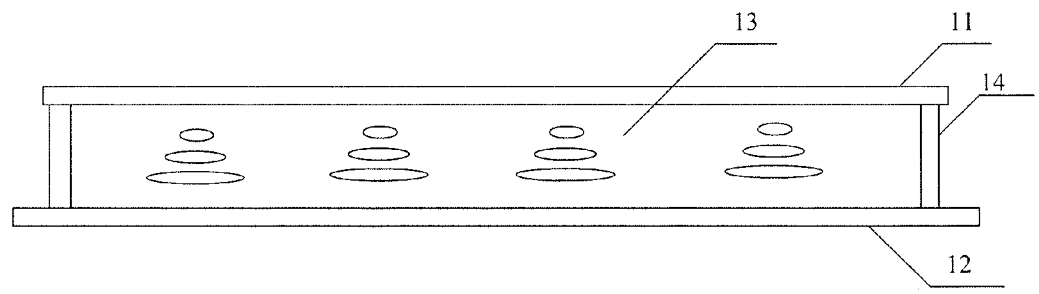
FIG. 1 is a schematic view of a structure of a liquid crystal display.
Figures 1, 5:
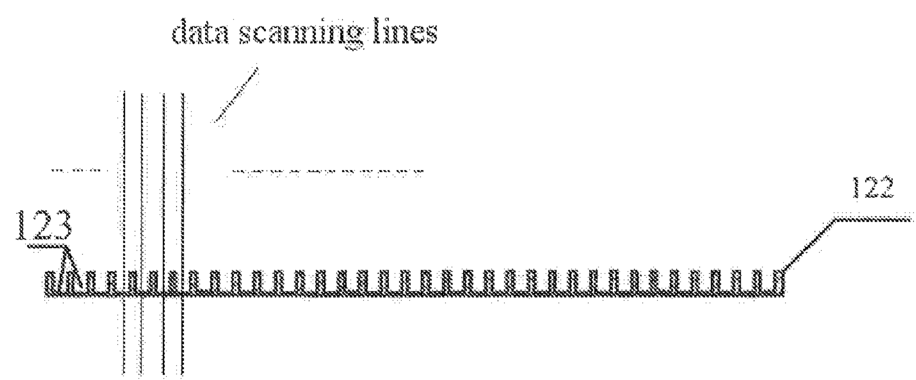
FIG. 5 is a schematic view of a still another arrangement of the electrode according to an embodiment of the present invention.

Since the metal electrode 122 is disposed on the array substrate 12, interlayer capacitances may be produced between the metal electrode 122 and other metal layers on the array substrate 12, which induces RC delay phenomenon. To resolve this problem, portions of the metal electrode 122 located opposite to the respective data scanning lines or gate scanning lines on the array substrate 12 are designed to be narrower than other portions of the metal electrode 122. For example, FIG. 5 shows the shape of the metal electrode 122 adjacent to the lead A of the data scanning line shown in the upper portion of FIG. 4; and FIG. 5-1 is a top view in the thickness direction of the liquid crystal display from the color filter substrate to the array substrate and shows the relationship between the metal electrode 122 and the data scanning lines. Grooves 123 are formed on the side of the metal electrode 122 facing the data scanning line, so that the area of the metal electrode 122 facing the data scanning line can be reduced, which decreases the interlayer capacitance.

Figure 6:
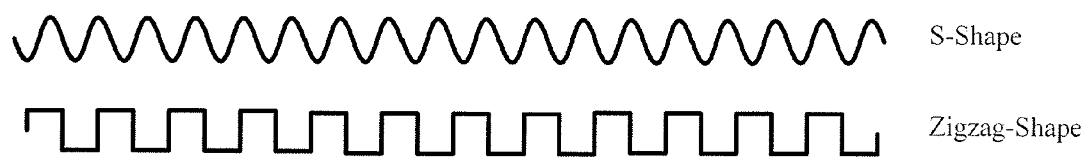
FIG. 6 is a schematic view of the electrode in S-shape, and zigzag shape according to an embodiment of the present invention.

In addition, the shape of the metal electrode 122 may be one or a combination of two or more selected from a group consisting of stripe shape, S-shape, zigzag-shape, and other shapes. Referring to FIG. 6, the metal electrode may be S-shaped or zigzag-shaped. Since the space between the display region 121 and the sealant is limited, the metal electrode is relatively small in general. The electric field area capable of preventing the impurity ions of the sealant from entering into the liquid crystal layer can be determined according to actual needs, and the shape and size of the metal electrode can be determined thereupon.

In the above embodiments, the electric field is formed between the metal electrode 122 and the common electrode 111 on the color filter substrate 11. The present invention, however, is not limited thereto. An auxiliary electrode 124 corresponding to the metal electrode 122 can be disposed on the color filter electrode 11, as shown in FIG. 2-1, and a second DC power which is different from the first DC power is applied on the auxiliary electrode, which also implements the present invention. The auxiliary electrode also can be made of the same material as the metal electrode 122 and can have the shape as the metal electrode 122. The second DC power can be provided by the DC drive power in the driving circuit within the liquid crystal display, as long as the voltage or polarity of the second DC power differs from that of the first DC power. To attract as many impurity ions as possible to the metal electrode or the auxiliary electrode, the voltage difference between the first and second DC power shall not be too small, it can be, e.g., 5V~35V (referring to the above embodiments). If the shape of the auxiliary electrode is the same as that of the metal electrode 122 and the auxiliary electrode is disposed opposite to the metal electrode 122, the electric field can be kept within the area where the auxiliary electrode is disposed opposite to the metal electrode, so that the electric field can not influence other portions of the liquid crystal display panel.

In the liquid crystal display according to the present invention, the metal electrode is formed between the edge portion of the display region of the array substrate and the sealant, and the metal electrode is connected to the first DC power, so that an electric field is formed due to the voltage difference between the metal electrode and the common electrode. Thus, the impurity ions in the sealant that enter into the electric field regions can be attached on the metal electrode or on the common electrode, which prevents the pollution to the liquid crystal caused by the impurity ions. In addition, if an auxiliary electrode is disposed on the color filter substrate, and a second DC power that is different from the first DC power may be supplied to the auxiliary electrode, the similar effect can also be achieved, that is, the metal electrode and the auxiliary electrode can attract and attach the impurity ions in the sealant that enter into the electric field region, which prevents the pollution to the liquid crystal caused by the impurity ions, reduces the line image sticking on the liquid crystal display, and improves the display quality of the liquid crystal display.

The above description only describes detailed embodiments of the present invention, it is not a limitation of the scope of the present invention. Accordingly, it should be understood that many modifications or alternation which can be made easily by those of ordinary skill in the art within the disclosure of the present invention, will fall within the scope of the present invention as defined by the appended claims.

What is claimed is:

1. A liquid crystal display, comprising:

a color filter substrate and an array substrate assembled together with a sealant, wherein an electrode is formed between an edge portion of an effective display region of the array substrate and the sealant and on a different layer from data scanning lines or gate scanning lines on the array substrate, and the electrode is connected to a first DC power;

outside of the effective display region, portions of the electrode located directly opposite to and facing, along a thickness direction of the liquid crystal display from the color filter substrate to the array substrate, respective data scanning lines on the array substrate are narrower than other portions of the electrode not directly opposite to and facing, along the thickness direction of the liquid crystal display, respective data scanning lines or gate scanning lines so as to decrease interlayer capacitance, and the narrower portions of the electrode are provided along an extension direction of the electrode outside of the effective display region.

2. The liquid crystal display according to claim 1, wherein the electrode is disposed along any one side or a plurality of sides of the effective display region.

3. The liquid crystal display according to claim 2, wherein the shape of the electrode is selected from a group consisting of stripe shape, S-shape, zigzag-shape, and any combination thereof.

4. The liquid crystal display according to claim 1, wherein the electrode is disposed surrounding the edge portion of the effective display region.

5. The liquid crystal display according to claim 4, wherein the shape of the electrode is selected from a group consisting of stripe shape, S-shape, zigzag-shape, and any combination thereof.

6. The liquid crystal display according to claim 1, wherein the electrode is made of a material selected from a group consisting of ITO, molybdenum, aluminum, copper, and any combination thereof.

7. The liquid crystal display according to claim 6, wherein the shape of the electrode is selected from a group consisting of stripe shape, S-shape, zigzag-shape, and any combination thereof.

8. The liquid crystal display according to claim 1, wherein an edge portion of a common electrode on the color filter substrate is aligned with an edge portion of the electrode neighboring the sealant.

9. The liquid crystal display according to claim 8, wherein the shape of the electrode is selected from a group consisting of stripe shape, S-shape, zigzag-shape, and any combination thereof.

10. The liquid crystal display according to claim 1, wherein an auxiliary electrode is disposed on the color filter substrate and opposite to the electrode.

11. The liquid crystal display according to claim 10, wherein the shape of the electrode is selected from a group consisting of stripe shape, S-shape, zigzag-shape, and any combination thereof.

12. The liquid crystal display according to claim 1, wherein the shape of the electrode is selected from a group consisting of stripe shape, S-shape, zigzag-shape, and any combination thereof.

13. The liquid crystal display according to claim 1, wherein a distance between the electrode and the sealant is 0.3 mm~4 mm.

14. The liquid crystal display according to claim 13, wherein the shape of the electrode is selected from a group consisting of stripe shape, S-shape, zigzag-shape, and any combination thereof.

15. A liquid crystal display, comprising:

a color filter substrate and an array substrate assembled together with a sealant, wherein an electrode is formed between an edge portion of an effective display region of the array substrate and the sealant, and the electrode is connected to a first DC power;

the electrode comprises grooves directly opposite to and facing, along a thickness direction of the liquid crystal display, respective data scanning lines or gate scanning lines on the array substrate to make an area of the electrode directly opposite to and facing, along the thickness direction of the liquid crystal display from the color filter substrate to the array substrate, the data scanning lines reduced compared with other portions of the electrode not directly opposite to and facing, along the thickness direction of the liquid crystal display, respective data scanning lines or gate scanning lines, and the grooves of the electrode are provided one by one along an extension direction of the electrode outside of the effective display region.

16. The liquid crystal display according to claim 15, wherein the electrode is disposed along any one side or a plurality of sides of the effective display region.

17. The liquid crystal display according to claim 16, wherein the shape of the electrode is selected from a group consisting of stripe shape, S-shape, zigzag-shape, and any combination thereof.

18. The liquid crystal display according to claim 15, wherein the electrode is disposed surrounding the edge portion of the effective display region.

19. The liquid crystal display according to claim 15, wherein an edge portion of a common electrode on the color filter substrate is aligned with an edge portion of the electrode neighboring the sealant.

20. The liquid crystal display according to claim 15, wherein an auxiliary electrode is disposed on the color filter substrate and opposite to the electrode.

* * * * *